United States Patent
Byun et al.

(10) Patent No.: US 7,637,646 B2
(45) Date of Patent: Dec. 29, 2009

(54) BACKLIGHT ASSEMBLY AND LIQUID CRYSTAL DISPLAY DEVICE HAVING THE SAME

(75) Inventors: Kwan Seob Byun, Gyeongsangbuk-do (KR); Jae Lag Ma, Daegu-si (KR); Myung Woo Jung, Gyeongsangbuk-do (KR); Sun Hee Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 99 days.

(21) Appl. No.: 11/522,438

(22) Filed: Sep. 18, 2006

(65) Prior Publication Data
US 2008/0002428 A1    Jan. 3, 2008

(30) Foreign Application Priority Data
Jun. 30, 2006    (KR) ...................... 10-2006-0060073

(51) Int. Cl.
*F21V 7/04* (2006.01)
(52) U.S. Cl. .................. 362/608; 362/610; 362/612; 362/615; 362/621; 362/628; 349/65
(58) Field of Classification Search .............. 362/600, 362/608, 612, 615, 621, 561, 610, 613, 628; 349/65
See application file for complete search history.

(56) References Cited

U.S. PATENT DOCUMENTS

| 7,139,048 B2 * | 11/2006 | Han et al. ............... 349/62 |
| 7,182,499 B2 * | 2/2007 | Chen et al. ............ 362/621 |
| 2003/0137821 A1 * | 7/2003 | Gotoh et al. ............ 362/31 |
| 2004/0114068 A1 | 6/2004 | Yu et al. |
| 2004/0207775 A1 * | 10/2004 | Min et al. ................ 349/65 |
| 2007/0008739 A1 * | 1/2007 | Kim et al. .............. 362/612 |
| 2007/0147079 A1 * | 6/2007 | Wu et al. ............... 362/612 |

FOREIGN PATENT DOCUMENTS

| CN | 1577005 | 2/2004 |
| JP | 6-051130 A | 2/1994 |
| JP | 2000-030520 | 1/2000 |
| JP | 2002-169032 | 6/2002 |
| JP | 2004-192937 | 7/2004 |
| JP | 2005-347208 A | 12/2005 |

* cited by examiner

*Primary Examiner*—Sandra L O'Shea
*Assistant Examiner*—Jessica L McMillan
(74) *Attorney, Agent, or Firm*—Morgan Lewis & Bockius LLP

(57) ABSTRACT

A backlight assembly includes a plurality of light emitting diodes (LEDs), a light guiding plate disposed on the same plane as the LEDs, and a plurality of optical correcting portions formed on a side of the light guiding plate and spaced apart from each other by a predetermined distance to change an optical path.

16 Claims, 11 Drawing Sheets

BACKLIGHT ASSEMBLY AND LIQUID CRYSTAL DISPLAY DEVICE HAVING THE SAME

This application claims the benefit of the Korean Patent Application No. 2006-60073 filed in Korea on Jun. 30, 2006, which is hereby incorporated by reference.

BACKGROUND OF THE INVENTION

1. Field of the Invention

The present invention relates to a backlight assembly for a flat panel display device, and more particularly, to a backlight assembly that is capable of improving its luminance uniformity and a liquid crystal display device with such a backlight assembly.

2. Discussion of the Related Art

A liquid crystal display (LCD) device is a flat display device for displaying an image, and has been widely utilized as a monitor for a computer, a television set or the like, because of its advantage of thin profile, light weight and low power consumption. The LCD device typically includes a liquid crystal panel for displaying an image and a backlight assembly for emitting light to the liquid crystal panel.

The backlight assembly may be classified into an edge-type and a direct-type according to the disposition of a light source. The edge-type backlight assembly includes a light guiding plate and a light source disposed on a side surface of the light guiding plate. The light guiding plate serves to guide light emitted from the light source frontward. The direct-type backlight assembly is suitable for a large-sized (e.g., more than 12-inch) LCD device, and includes a plurality of light sources formed on a rear surface of the liquid crystal panel. The light emitted from the light sources is directly emitted to the liquid crystal panel.

The light source of the backlight assembly may be selected from any one of an electro luminescence (EL), a cold cathode fluorescent lamp (CCFL), a hot cathode fluorescent lamp (HCFL), and a light emitting diode (LED). The LEDs include red, green and blue LEDs and also white LEDs. Since the LEDs have the advantage of maintaining the uniformity of the light while reducing a thickness of the LCD device, the LEDs can contribute to a high luminance backlight assembly.

FIG. 1 is an exploded perspective view illustrating an edge-type LCD device having LEDs, and FIG. 2 is a top view illustrating luminance of the LCD device of FIG. 1 according to the related art. As shown in FIGS. 1 and 2, the related art edge-type LCD device includes a liquid crystal panel 10, and a backlight assembly 20 that emits light to the liquid crystal panel 10.

Referring to FIG. 1, the backlight assembly 20 includes a bottom cover 90, a reflective plate 70, a light guiding plate 50, a plurality of optical sheets 30, and a plurality of LEDs 60. The LEDs 60 are disposed at a side of the bottom cover 90 and spaced apart from each other. The backlight assembly 20 further includes a printed circuit board (PCB) 61 provided with an electric conductive pattern to supply electric power to the LEDs 60, and a housing 62 enclosing the LEDs 60 to guide the light generated from the LEDs 60 to the light guiding plate 50.

Referring to FIG. 2, the LEDs 60 and the light guiding plate 50 are disposed on an identical plane such that the light generated from the LEDs 60 is incident on a side surface of the light guiding plate 50. Moreover, the LEDs 60 have an emission angle of about 100°, and thus the light emitted from the LEDs 60 is incident on the incident surface of the light guiding plate 50. Due to the medium difference at the incident surface of the light guiding plate 50, the light path is changed.

However, in the related art LCD, the emission angle of the light emitted from the LEDs 60 and incident on the incident surface of the light guiding plate is reduced by the medium difference. As a result, bright portions A and dark portions B are alternately generated at the incident surface area of the light guiding plate 50, causing hot spots where the luminance is not uniform at areas where the LEDs 60 are disposed.

SUMMARY OF THE INVENTION

Accordingly, the present invention is directed to a backlight assembly and a liquid crystal display (LCD) device having the backlight assembly that substantially obviate one or more problems due to limitations and disadvantages of the related art.

An object of the present invention is to provide a backlight assembly in which luminance uniformity can be enhanced by changing a shape of the light incident portion of a light guiding plate to diffuse the light, and an LCD device having such a backlight assembly.

Another object of the present invention is to provide a backlight assembly in which heat dissipation efficiency is improved, and an LCD device having such a backlight assembly.

Additional advantages, objects, and features of the invention will be set forth in part in the description which follows, and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the backlight assembly includes a plurality of light emitting diodes (LEDs), a light guiding plate disposed on the same plane as the LED, and a plurality of optical correcting portions formed on a side of the light guiding plate and spaced apart from each other by a predetermined distance to change the optical path.

In another aspect of the present invention, the LCD device includes a plurality of light emitting diodes (LEDs), a light guiding plate disposed on the same plane as the LED, a plurality of optical correcting portions formed on a side of the light guiding plate and spaced apart from each other by a predetermined distance to change the optical path, and a liquid crystal panel disposed on the light guiding plate to display an image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
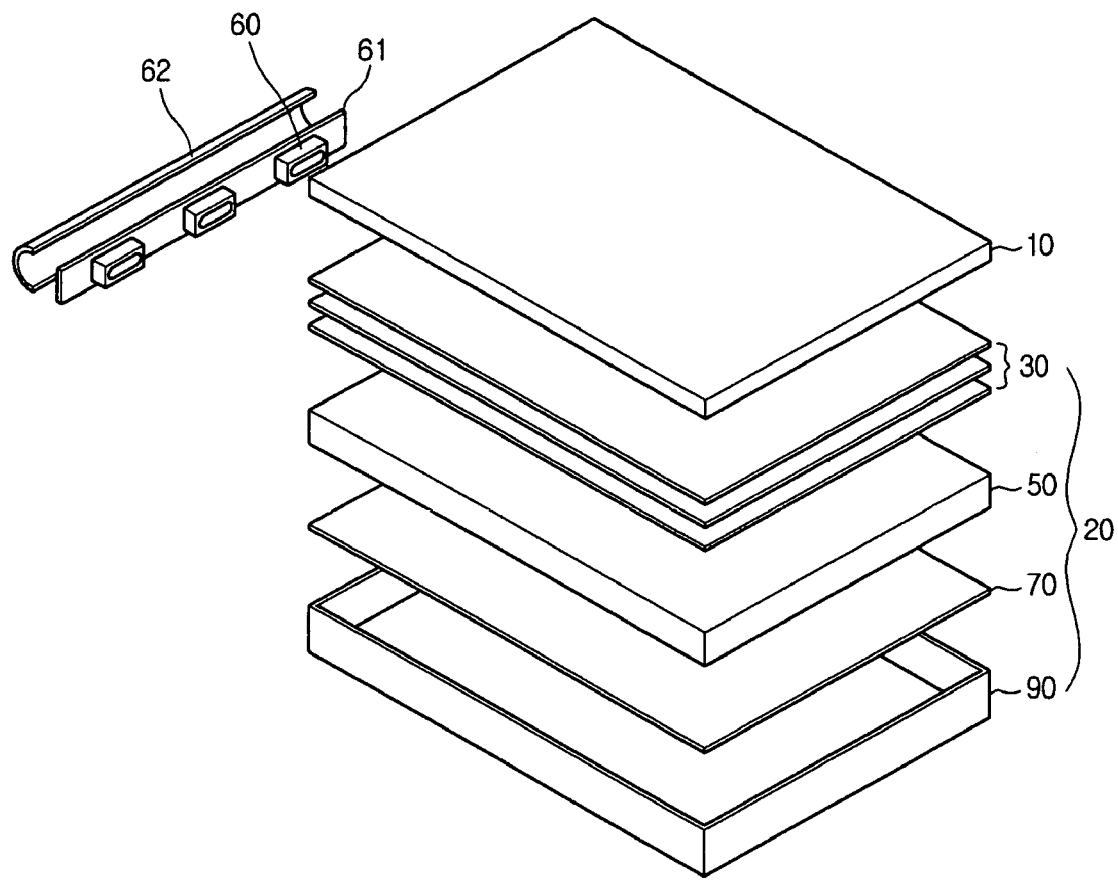
FIG. 1 is an exploded perspective view illustrating an edge-type LCD device having LEDs according to the related art.
Figure 2:
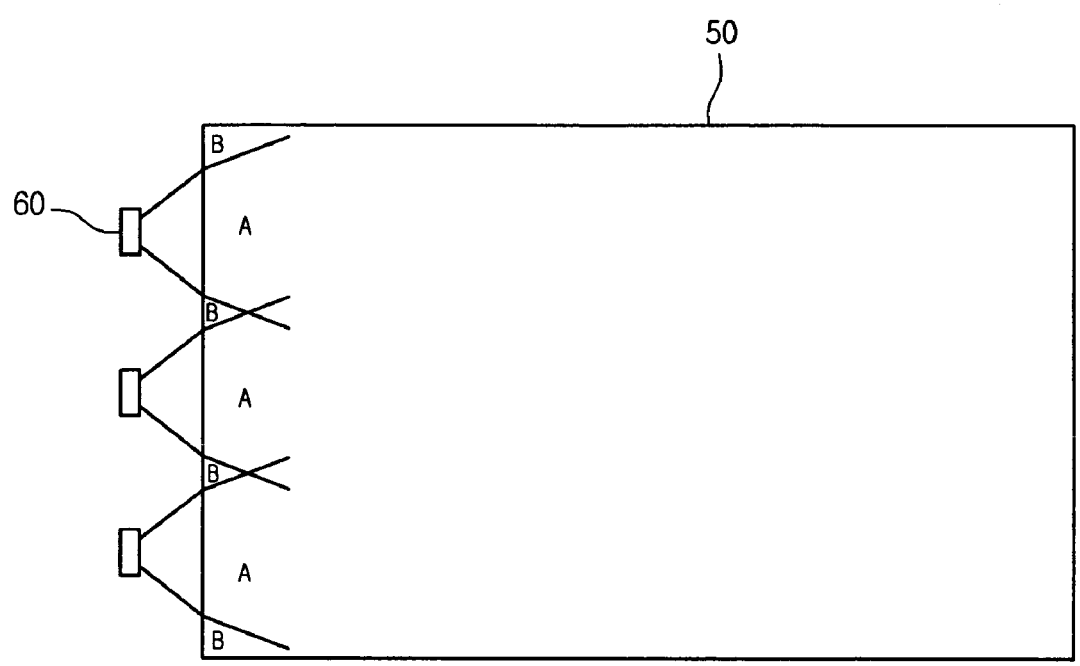
FIG. 2 is a top view illustrating luminance of the LCD device of FIG. 1.
Figure 3:
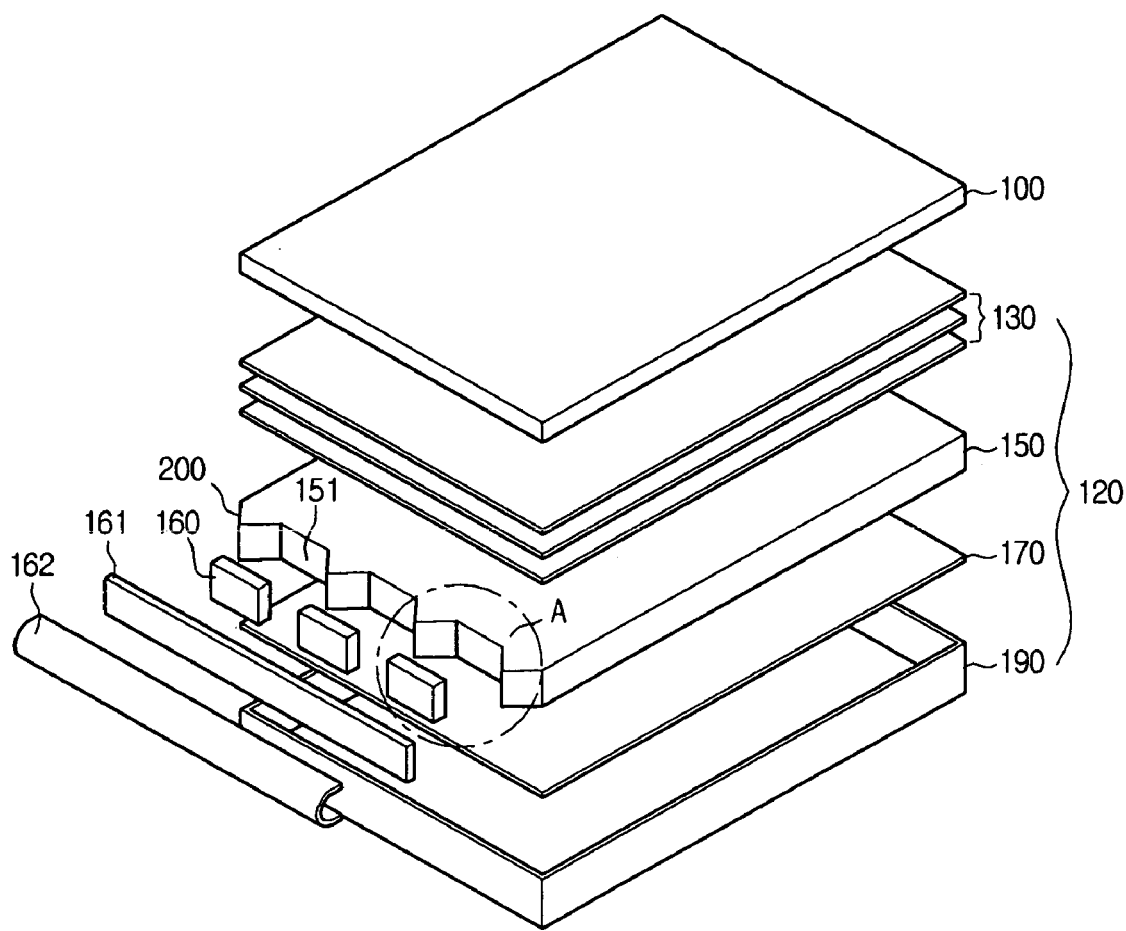
FIG. 3 is an exploded perspective view illustrating an edge-type LCD device according to a first exemplary embodiment of the present invention.
Figure 4:
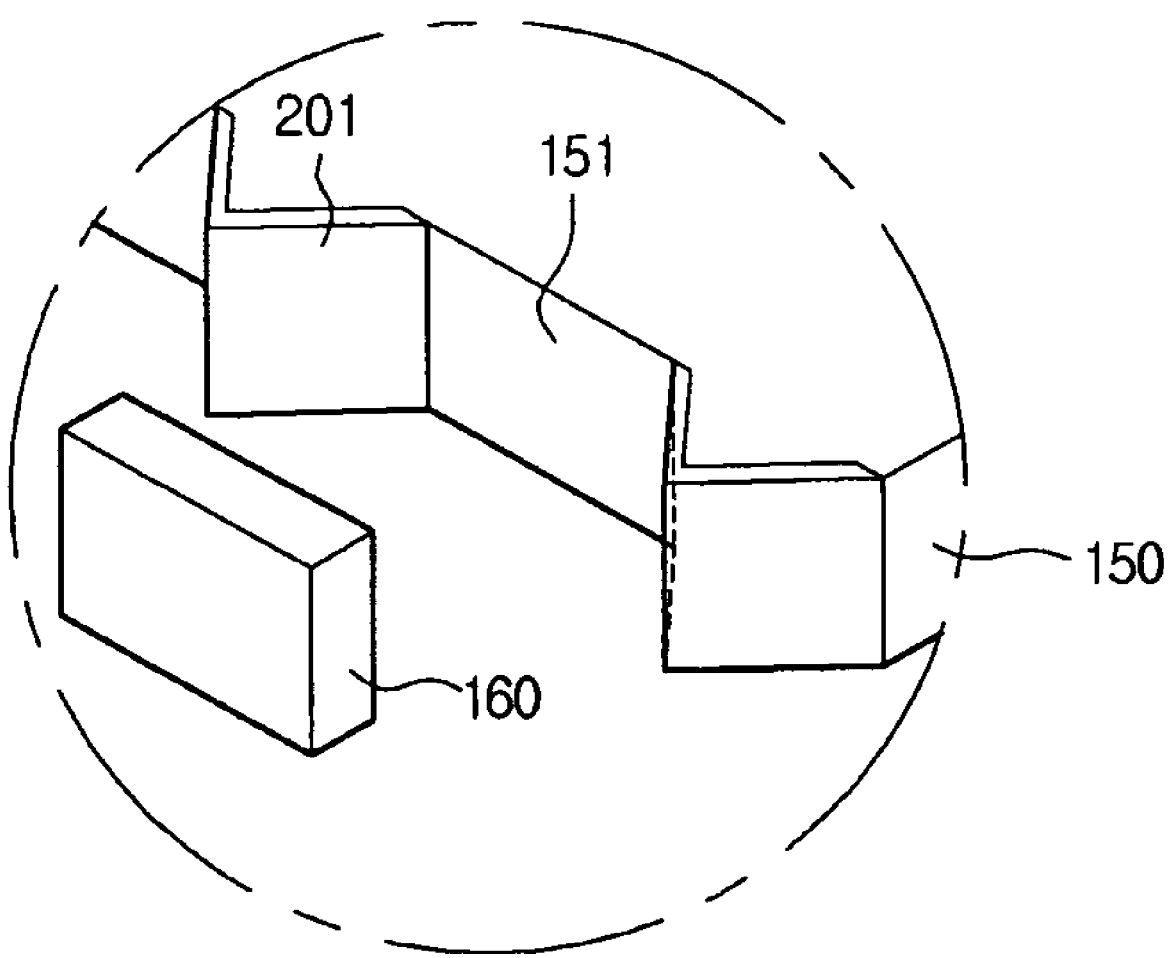
FIG. 4 is an enlarged perspective view of portion A of FIG. 3, illustrating an exemplary light guiding plate and an LED.

FIG. 3 is an exploded perspective view illustrating an edge-type LCD device according to a first exemplary embodiment of the present invention. FIG. 4 is a perspective view of portion A of FIG. 3, illustrating an exemplary light guiding plate and an LED.

As shown in FIGS. 3 and 4, the edge-type LCD device according to the first exemplary embodiment includes a liquid crystal panel 100 and a backlight assembly 120 emitting light toward the liquid crystal panel 100. Although not shown, the liquid crystal panel 100 includes a TFT array substrate, a color filter substrate, and a liquid crystal layer interposed between the TFT array substrate and the color filter substrate.

The backlight assembly 120 includes a bottom cover 190, a plurality of LEDs 160 disposed on the bottom case 190 and spaced apart from each other, a light guiding plate 150 disposed on the same plane as the LEDs 160 to convert point light generated from the LEDs 160 into surface light, a reflective plate 170 disposed on a rear surface of the light guiding plate 150 to reflect the light toward the liquid crystal panel 100, and a plurality of optical sheets 130 disposed in front of the LEDs 160 to diffuse and focus the light. The backlight further includes a printed circuit board (PCB) 161 on which an electric conductive pattern for applying electric power to the LEDs 160 is formed, and a housing 162 enclosing the LEDs 160 and reflecting the light toward the light guiding plate 150. The LEDs 160 may be red, green and blue LEDs. Alternatively, the LEDs 160 may be white LEDs emitting white light.

In order to enhance the light efficiency of the light guiding plate 150, a plurality of prism patterns having a plurality of protrusions may be formed on the front and/or rear surface of the light guiding plate 150. The light guiding plate 150 may be formed of poly methyl methacrylate resin having a high light transmittance or glass having high thermal-resistance. The light guiding plate 150 may be formed as a flat type or a wedge type. When the light guiding plate 150 is formed of glass, the thermal deformation of the light guiding plate 150 can be minimized.

Moreover, the light guiding plate 150 includes a plurality of protrusions 200 and a plurality of light incident surfaces 151, which are formed on a side of the light guiding plate 150. The plurality of light incident surfaces 151 face the LEDs 160, respectively. Each of the protrusions 200 has a triangular section. As shown in FIG. 4, each protrusion 200 includes two protruding surfaces on which reflective sheets 201 are attached by adhesive or a two-sided tape. The reflective sheets 201 are exemplary only. Alternatively, reflective layers formed of Ag, for example, may also be coated on the protruding surfaces of the protrusions 200. The LEDs 160 are disposed to correspond to the light incident surfaces 151. That is, the LEDs 160 are disposed between the protrusions 200. In addition, the protrusions 200 may be integrally formed with the light guiding plate 150 during the manufacturing process of the light guiding plate 150.

According to the first exemplary embodiment, the light emitted from the LEDs 160 is incident on the side of the light guiding plate 150. Then, the light is reflected in the light guiding plate 150 and directed to the optical sheets 130. At this point, some of the light reflected in the light guiding plate 150 may be directed to the light incident surfaces 151 and the protrusions 200. The light directed to the protrusions 200 is reflected to an area around the protrusions 200 according to the shape of the protrusions 200 and by the reflective sheets 201. Therefore, the luminance at the area around the protrusions 200 that do not correspond to the LEDs 160 can be enhanced by the light reflected to the area around the protrusions 200. That is, the hot spot problem is thus solved by varying the shape of the light guiding plate 150.

Figure 5:
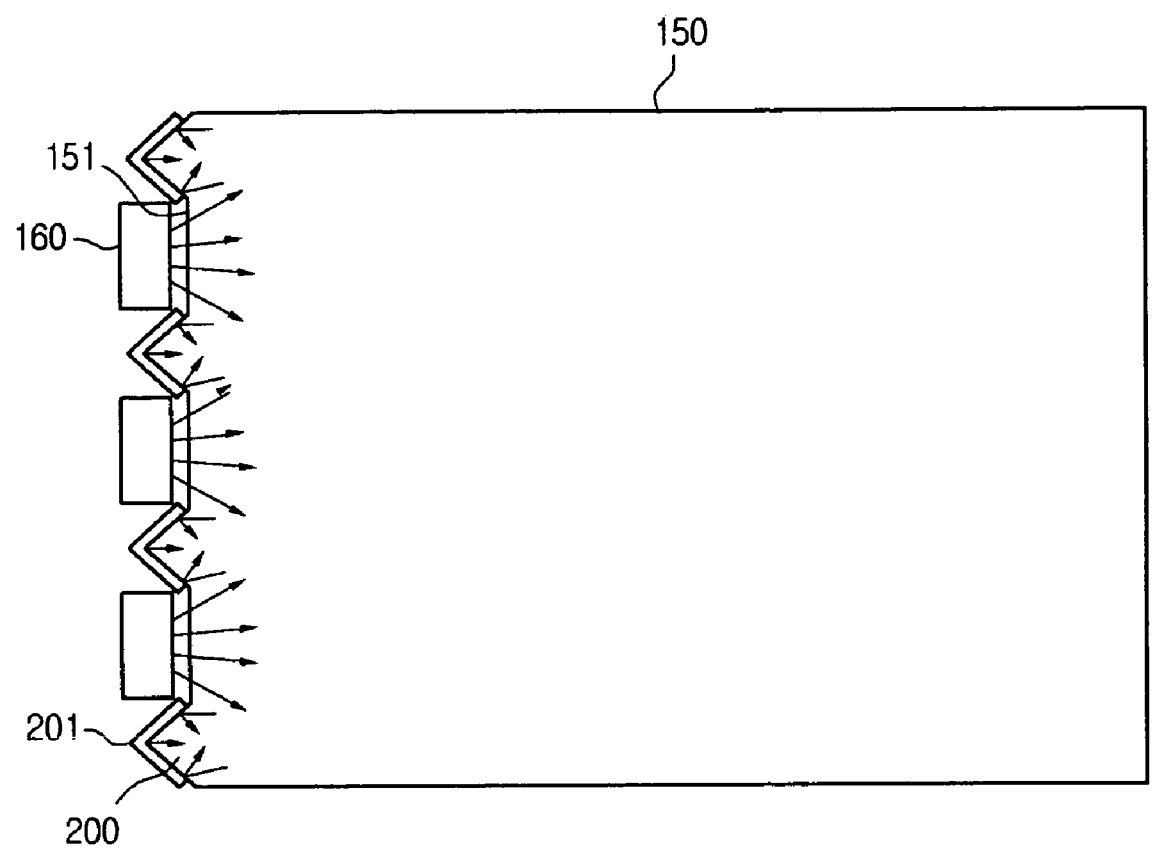
FIG. 5 is a top view illustrating an exemplary light path of the edge-type LCD device of FIG. 3.

FIG. 5 is a top view illustrating an exemplary light path of the edge-type LCD device of FIG. 3. As shown in FIG. 5, the plurality of protrusions 200 spaced apart from each other by predetermined intervals and corresponding to the LEDs 160 are formed at the side of the light guiding plate 150. The reflective sheets 201 are attached on the surfaces of the protrusions 200. The light emitted from the LEDs 160 is incident on the incident surfaces 151 of the light guiding plate 150. At this point, the light incident on the protrusions 200 is reflected and scattered by the reflective sheets 201, thereby enhancing the luminance around the protrusions 200. As described above, by varying the shape of the light guiding plate 150, the hot spot problem in the related art can be solved.

Figure 6:
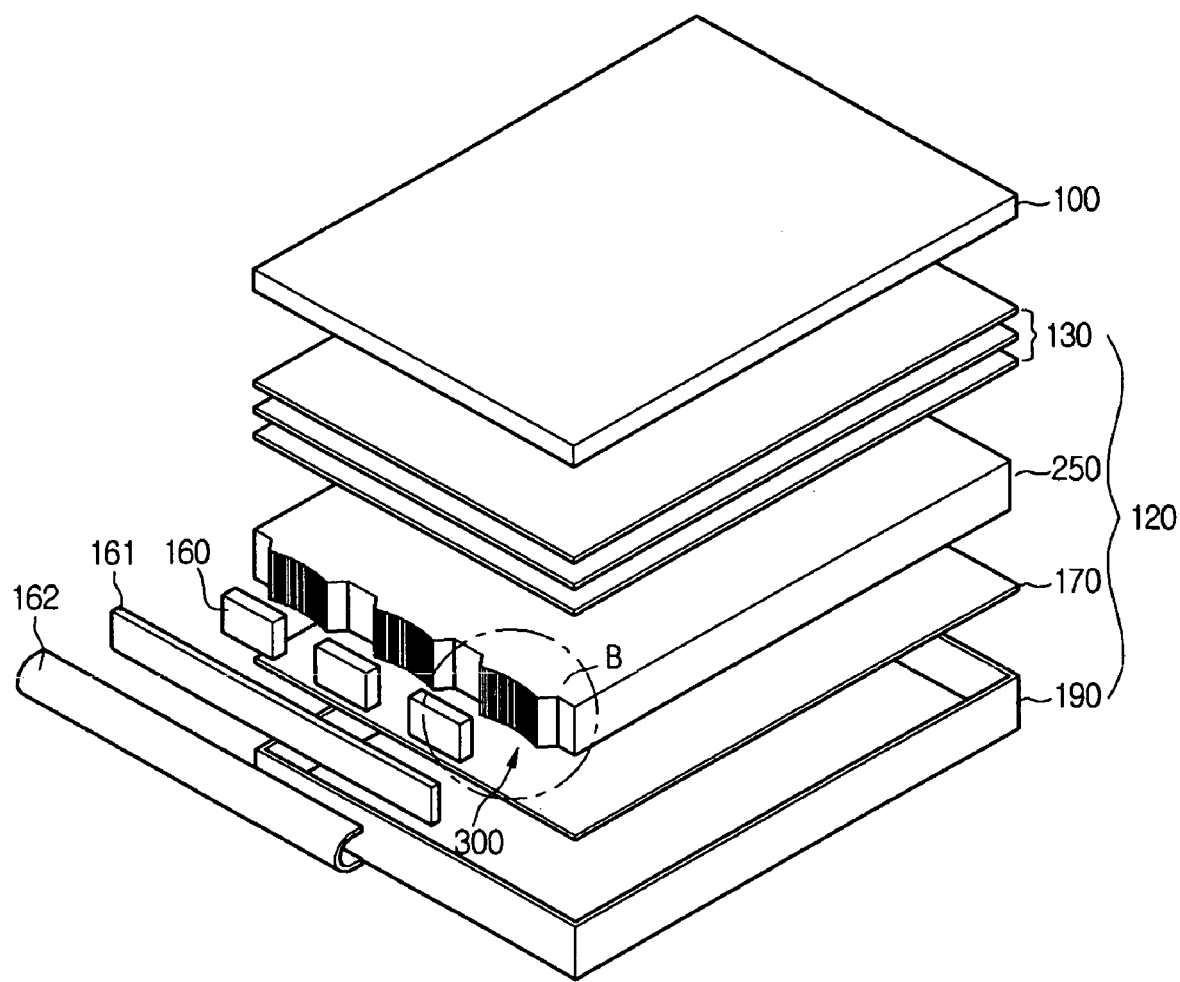
FIG. 6 is an exploded perspective view illustrating an edge-type LCD device according to a second exemplary embodiment of the present invention.
Figure 7:
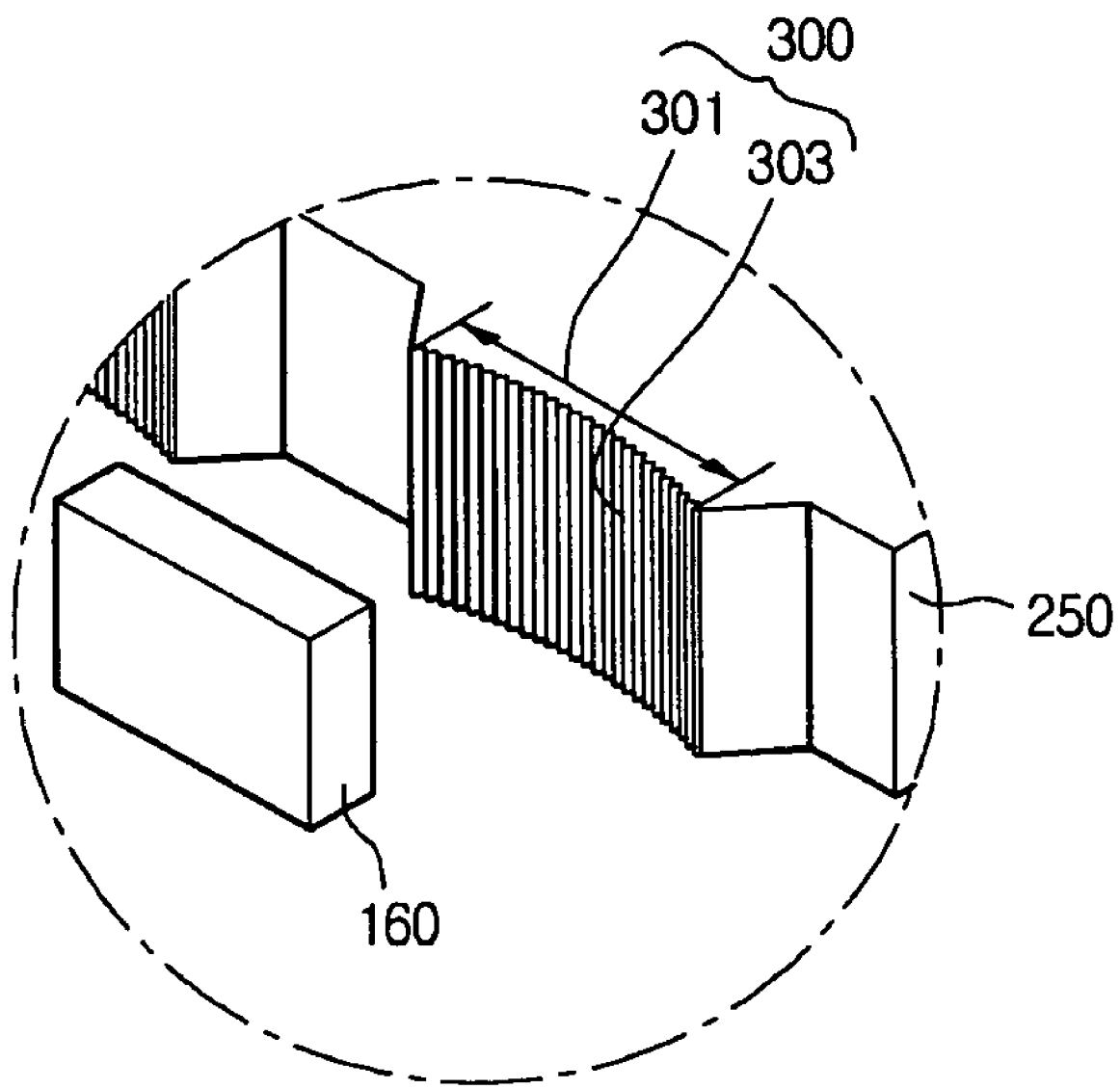
FIG. 7 is a perspective view of portion B of FIG. 6, illustrating an exemplary light guiding plate and an LED.

FIG. 6 is an exploded perspective view illustrating an edge-type LCD device according to a second exemplary embodiment of the present invention. FIG. 7 is a perspective view of portion B of FIG. 6, illustrating an exemplary light guiding plate and an LED FIG. 8 is a top view illustrating an exemplary light path of the edge-type LCD device of FIG. 6.

Figure 8:
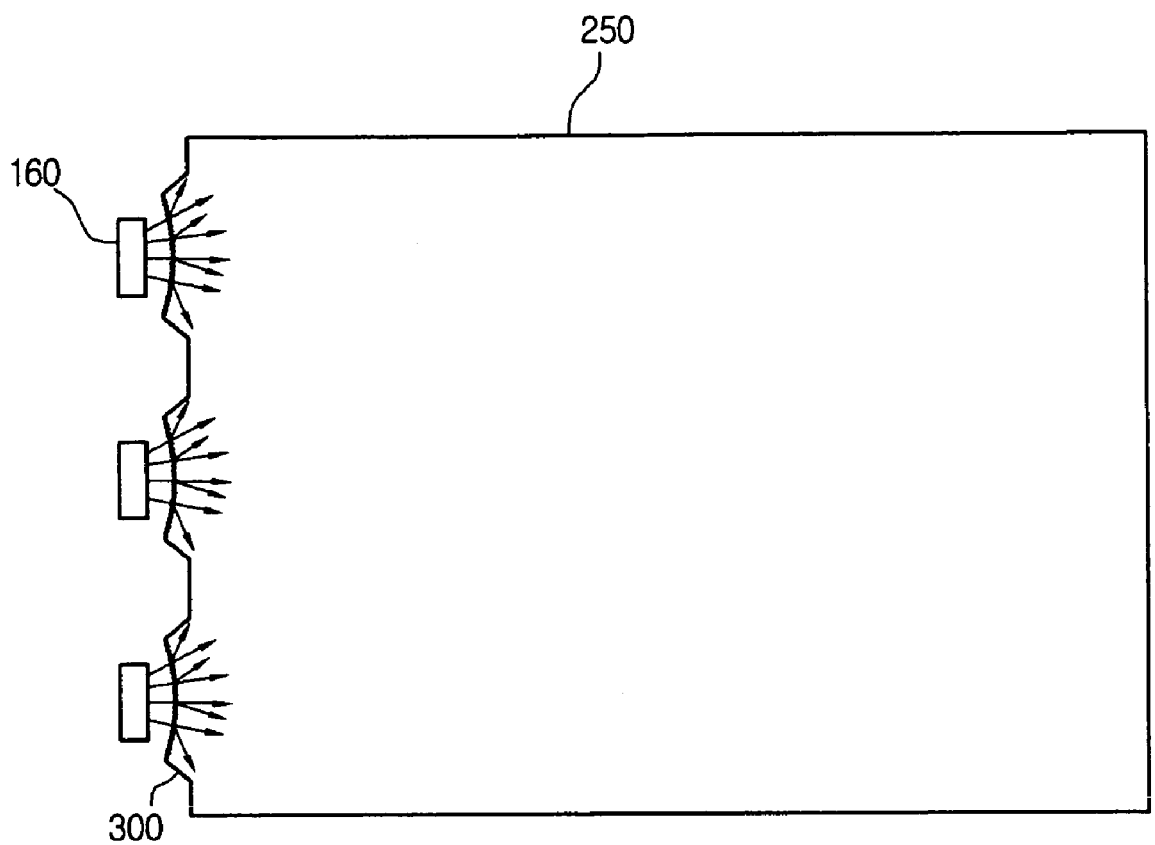
FIG. 8 is a top view illustrating an exemplary light path of the edge-type LCD device of FIG. 6.

As shown in FIGS. 6 through 8, an edge-type LCD device of the second exemplary embodiment is similar to the first exemplary embodiment of FIGS. 3 through 5 except for a light guiding plate 250. Therefore, the description of the identical parts will be omitted herein and the like reference numbers will be applied thereto.

The light guiding plate 250 includes a side which corresponds to the LEDs 160 and is formed with optical correcting portions 300 that are spaced apart from each other. The optical correcting portions 300 include protruding surfaces that face the LEDs 160, respectively. Moreover, as shown in FIG. 7, each protruding surface of the optical correcting portion 300 is shaped in accordance with an optical path of the LEDs 160. In this exemplary embodiment, the protruding surface is concave and is provided with a diffusion pattern that is formed in a radial structure. The diffusion pattern includes a plurality of round-shaped grooves 301. Thus, the light emitted from the LEDs 160 is diffused while passing through the optical correcting portions 300, thereby solving the hot spot problem in the related art.

As described above, referring to FIG. 8, the light is diffused by the optical correcting portions 300 formed on the side of the light guiding plate 250 and provided with the rounded grooves 301 (of FIG. 7) each having the diffusion pattern 303 (of FIG. 7). Accordingly, the luminance can be made uniform throughout the entire surface of the light guiding plate 250. That is, by enlarging the light emission angle of the LEDs 160 using the optical correcting portions 300, the hot spot problem can be solved.

Figure 9:
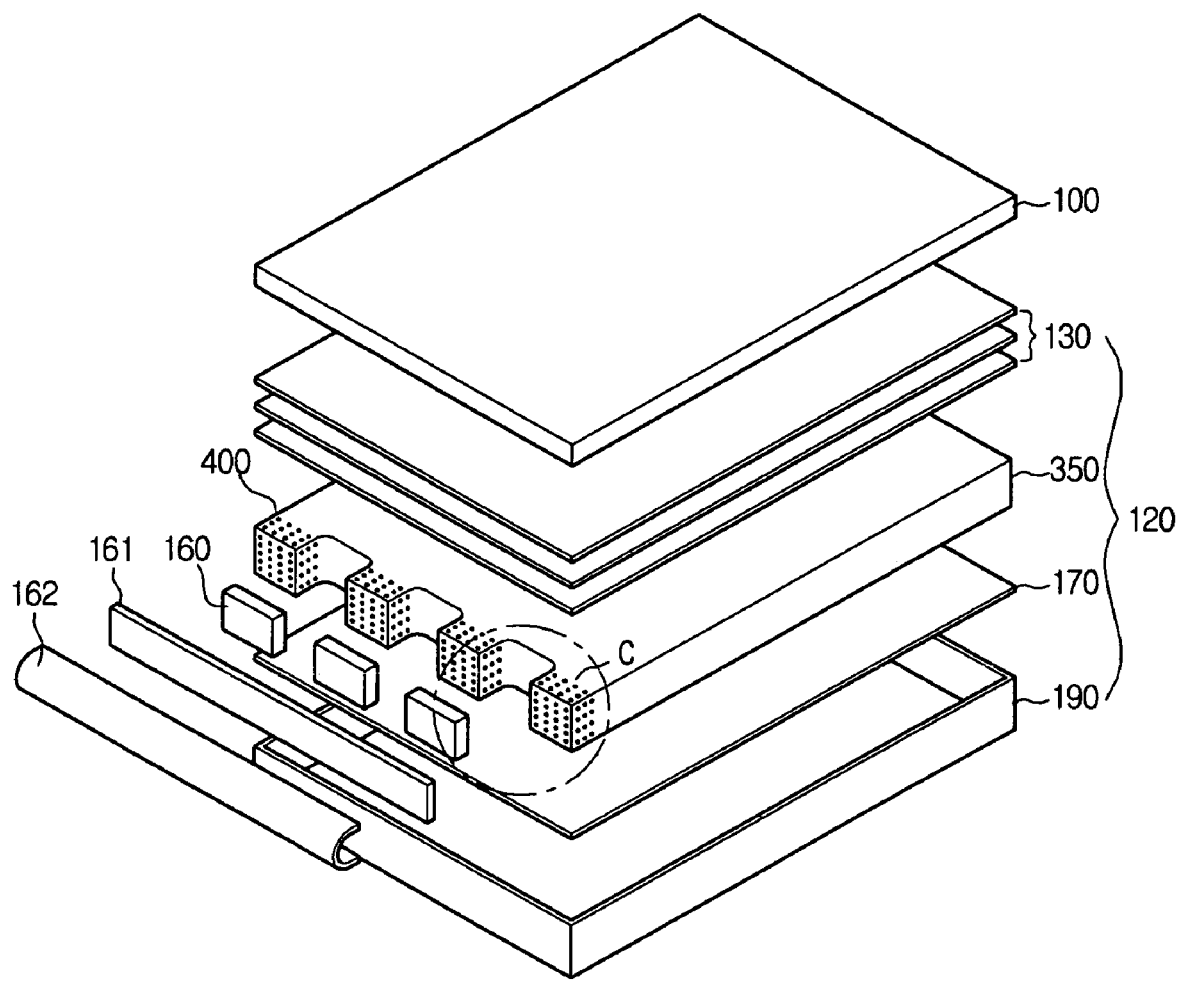
FIG. 9 is an exploded perspective view illustrating an edge-type LCD device according to a third exemplary embodiment of the present invention.
Figure 10:
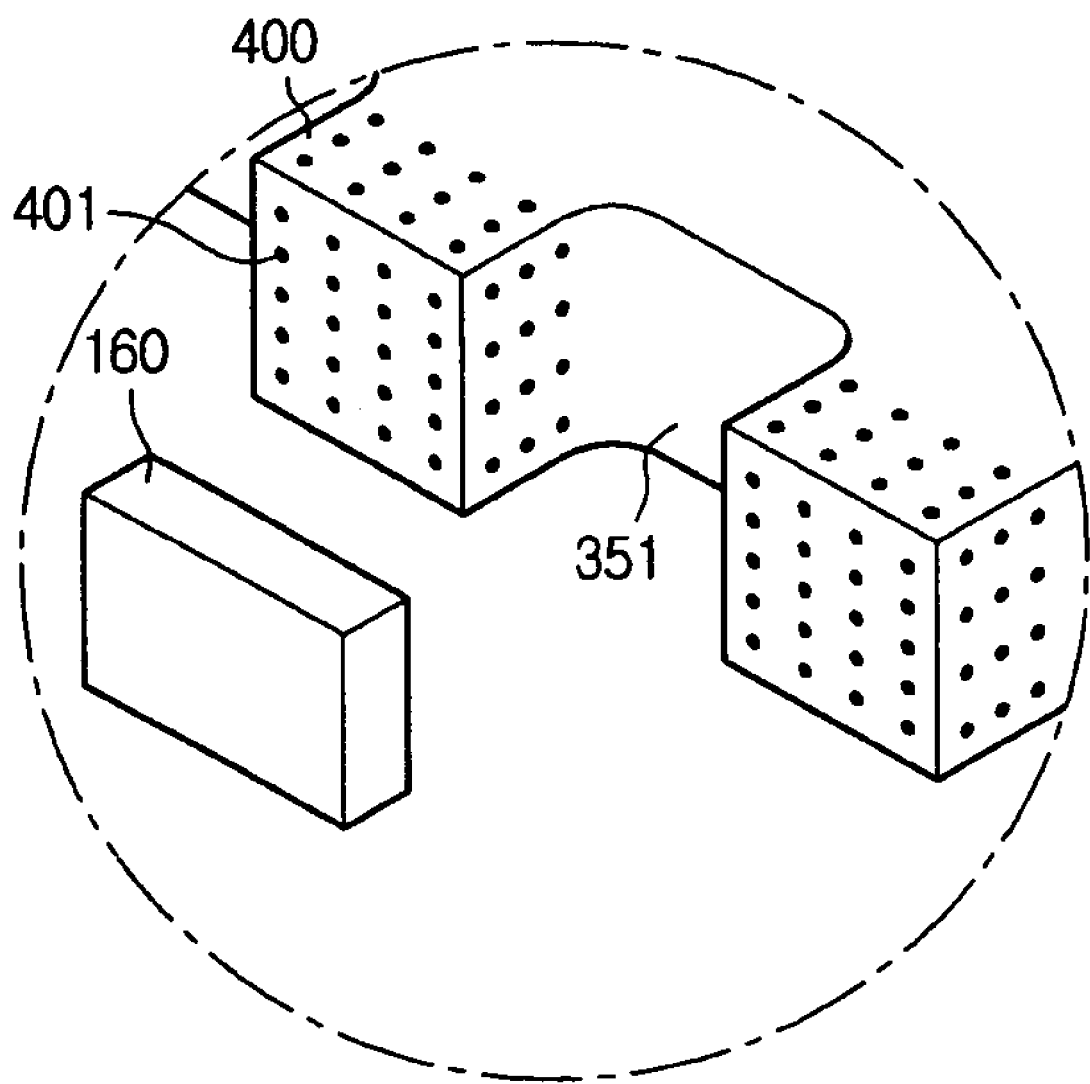
FIG. 10 is a perspective view of portion C of FIG. 9, illustrating an exemplary light guiding plate and an LED.
Figure 11:
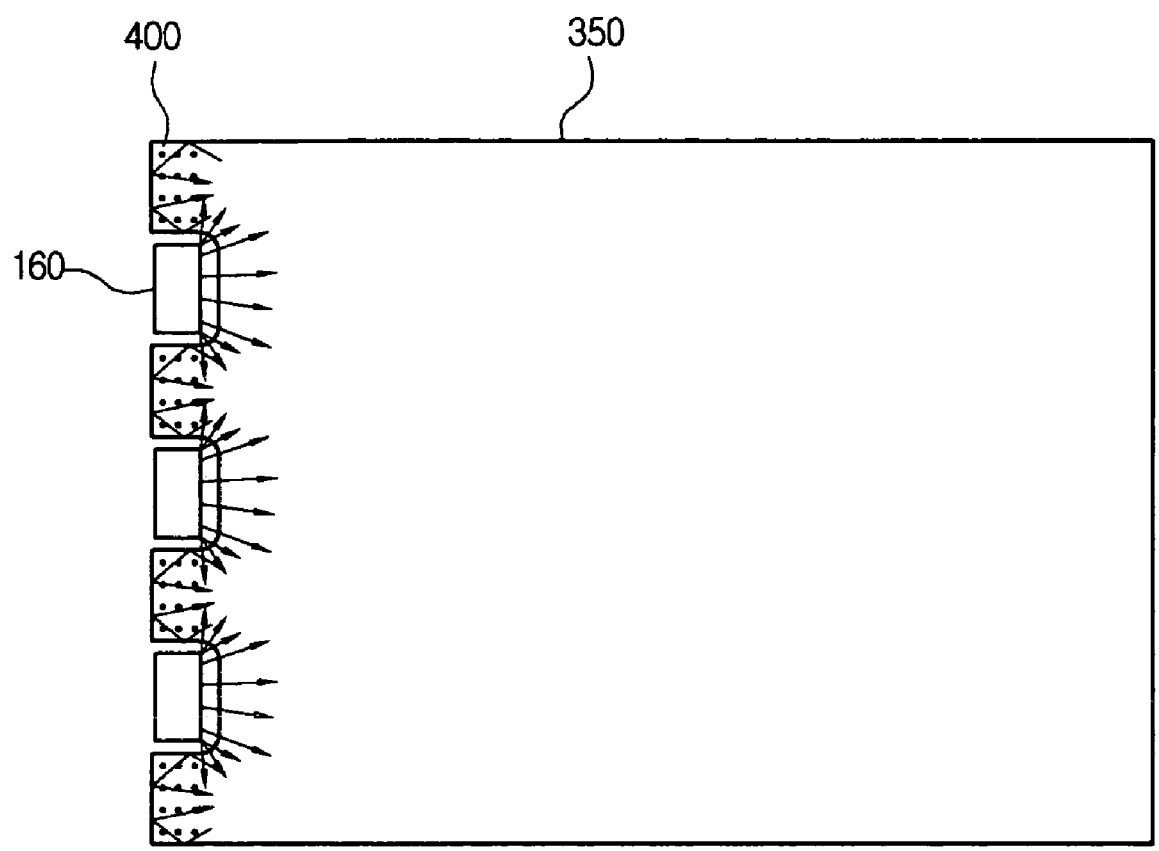
FIG. 11 is a top view illustrating an exemplary light path of the edge-type LCD device of FIG. 9.

FIG. 9 is an exploded perspective view illustrating an edge-type LCD device according to a third exemplary embodiment of the present invention. FIG. 10 is a perspective view of portion C of FIG. 9, illustrating an exemplary light guiding plate and an LED. FIG. 11 is a top view illustrating an exemplary light path of the edge-type LCD device of FIG. 9.

As shown in FIGS. 9 through 11, an edge-type LCD device of the third exemplary embodiment is similar to that of FIGS. 3 through 5 except for a light guiding plate 350. Therefore, the description of the identical parts will be omitted herein and the like reference numbers will be applied thereto.

The light guiding plate 350 includes one side that corresponds to the LEDs 160 and is formed with optical correcting portions 400 spaced apart from each other. Each of the optical correcting portions 400 has a rectangular-shaped section. Portion where the optical correcting portion 400 meets a light incident surface 351 may be rounded so that the light emitted from the LEDs 160 can be effectively directed to the optical correcting portions 400. Such portion may also be formed with other shapes. A dot pattern 401 is formed on the optical correcting portion 400 to diffuse the light. The shape of the dot pattern 401 may be formed in a variety of shapes. A rate of the dot pattern 401 per unit area may also be adjusted. The dot pattern 401 as shown is merely an example in this embodiment, and therefore other patterns may be utilized to diffuse the light.

The LEDs 160 are disposed to correspond to the light incident surfaces 351 between the optical correcting portions 400. The light emitted from the LEDs 160 is incident on the incident surfaces 351 and diffused by the rounded portion between the incident surfaces 351 and the optical correcting portions 400. At this point, the light directed toward the optical correcting portions 400 is diffused by the dot pattern 401 to enhance the luminance of areas around thereof.

As described above, referring to FIG. 11, the plurality of the optical correcting portions 400 are integrally formed at the side of the light guiding plate 350. Accordingly, the luminance of the dark portions can be improved, thereby improving the luminance uniformity of the light guiding plate 350.

According to the first exemplary embodiments of the present invention, by providing the reflective sheets on the surfaces of the protrusions formed on the light guiding plate, the light can be reflected toward the low luminance areas by the reflective sheets, thereby improving the luminance uniformity of the light guiding plate. According to the second exemplary embodiment of the present invention, since the optical correcting portions protruding from a side of the light guiding plate and provided with the rounded grooves having the diffusion pattern, the light emitted from the LEDs can be diffused to improve the luminance uniformity of the light guiding plate. According to the third exemplary embodiment of the present invention, since the optical correcting portion protruding from the light guiding plate and having the dot pattern, the light emitted from the LEDs can be diffused to improve the luminance uniformity of the light guiding plate.

It will be apparent to those skilled in the art that various modifications and variations can be made in the backlight assembly of the present invention and LCD device having the same without departing from the spirit or scope of the invention. Thus, it is intended that the present invention covers the modifications and variations of this invention provided they come within the scope of the appended claims and their equivalents.

What is claimed is:

1. A backlight assembly, comprising:
a plurality of light emitting diodes (LEDs);
a light guiding plate disposed on a same plane as the LEDs; and
a plurality of optical correcting portions formed on a side of the light guiding plate, disposed between the LEDs, protruded from the light guiding plate and spaced apart by a predetermined interval to change an optical path,
wherein the optical correcting portions include a dot pattern,
wherein the light guiding plate includes a plurality of light incident surfaces between the optical correcting portions, and
wherein the LEDs correspond to the incident surfaces.

2. The backlight assembly according to claim 1, wherein each of the optical correcting portions includes a triangular section.

3. The backlight assembly according to claim 2, comprising a reflective member attached on a surface of the triangular section of the optical correcting portion, wherein the reflective member includes at least one of a reflective sheet and a reflective layer.

4. The backlight assembly according to claim 1, wherein the optical correcting portions include rectangular sections, such that the light incident surfaces are formed between the rectangular sections and the LEDs face the light incident surfaces, respectively.

5. The backlight assembly according to claim 4, further comprising a portion to diffuse the light between the light incident surface and the optical correction portion.

6. The backlight assembly according to claim 1, comprising a rounded portion between the optical correcting portion and the incident surface.

7. A liquid crystal display device, comprising:
a plurality of light emitting diodes (LEDs);
a light guiding plate disposed on a same plane as the LEDs;
a plurality of optical correcting portions formed on a side of the light guiding plate, disposed between the LEDs, protruded from the light guiding plate and spaced apart from each other by a predetermined interval to change an optical path; and
a liquid crystal display panel disposed on the light guiding plate to display an image,
wherein the optical correcting portions include a dot pattern,
wherein the light guiding plate includes a plurality of light incident surfaces between the optical correcting portions, and
wherein the LEDs correspond to the incident surfaces.

8. The liquid crystal display device according to claim 7, wherein each of the optical correcting portions includes a triangular section.

9. The liquid crystal display device according to claim 8, comprising a reflective member attached on a surface of the triangular section of the optical correcting portion, wherein the reflective member includes at least one of a reflective sheet and a reflective layer.

10. The liquid crystal display device according to claim 7, the optical correcting portions include rectangular sections, such that the light incident surfaces are formed between the rectangular sections and the LEDs respectively face the light incident surfaces.

11. The liquid crystal display device according to claim 10, further comprising a portion to diffuse the light between the light incident surface and the optical correction portion.

12. A method of manufacturing a liquid crystal display device, comprising:
 disposing a light guiding plate on a same plane as a plurality of light emitting diodes (LEDs);
 forming a plurality of optical correcting portions on a side of the light guiding plate, disposing between the LEDs, protruding from the light guiding plate and spacing them apart from each other by a predetermined interval to change an optical path; and
 disposing a liquid crystal display panel on the light guiding plate to display an image,
 wherein the optical correcting portions include a dot pattern,
 wherein the light guiding plate includes a plurality of light incident surfaces between the optical correcting portions, and
 wherein the LEDs correspond to the incident surfaces.

13. The method according to claim 12, wherein each of the optical correcting portions the protrusion includes a triangular section.

14. The method according to claim 13, comprising a reflective member attached on a surface of the triangular section of the optical correcting portion, wherein the reflective member includes at least one of a reflective sheet and a reflective layer.

15. The method according to claim 12, wherein the optical correcting portions include rectangular sections, such that the light incident surfaces are formed between the rectangular sections and the LEDs respectively face the light incident surfaces.

16. The method according to claim 15, further comprising a portion to diffuse the light between the light incident surface and the optical correction portion.

* * * * *